United States Patent [19]

Gibson et al.

[11] Patent Number: 5,460,897
[45] Date of Patent: Oct. 24, 1995

[54] SOLID OXIDE FUEL CELL STACKING ASSEMBLY

[75] Inventors: Richard Gibson, Torrance; Allen MacKnight, Lakewood, both of Calif.

[73] Assignee: Allied Signal Inc.

[21] Appl. No.: 215,068

[22] Filed: Mar. 18, 1994

[51] Int. Cl.[6] .................................................. H01M 2/14
[52] U.S. Cl. ......................... 429/39; 429/32; 429/34; 429/35; 429/38
[58] Field of Search ......................... 429/32, 34, 35, 429/38, 39

[56] References Cited

U.S. PATENT DOCUMENTS

| | | | |
|---|---|---|---|
| 4,476,196 | 10/1984 | Poeppel et al. | 429/32 |
| 4,476,198 | 10/1984 | Ackerman et al. | 429/32 |
| 4,499,663 | 2/1985 | Zwick et al. | 429/32 |
| 4,510,212 | 4/1985 | Fraioli | 429/30 |
| 4,738,905 | 4/1988 | Collins | 429/38 |
| 4,857,420 | 8/1989 | Maricle et al. | 429/30 |
| 4,997,726 | 3/1991 | Akiyama et al. | 429/32 |
| 4,997,727 | 3/1991 | Bossel | 429/33 |
| 5,045,413 | 9/1991 | Marianowski | 429/39 |
| 5,049,458 | 9/1991 | Sato et al. | 429/39 |
| 5,077,148 | 12/1991 | Schora et al. | 429/39 |
| 5,079,105 | 1/1992 | Bossel | 429/32 |
| 5,080,689 | 1/1992 | Pal et al. | 29/623.5 |

*Primary Examiner*—John Niebling
*Assistant Examiner*—Bruce F. Bell
*Attorney, Agent, or Firm*—John R. Rafter

[57] ABSTRACT

A solid oxide fuel cell stacking assembly is formed of a stack of fuel cell assemblies, manifolds to introduce the reactants to the fuel cell and carry away reaction products and unused reactants, and current collectors at the ends of the stack of assemblies. Each fuel cell assembly is formed of at least two fuel cell subassemblies and an interconnect subassembly disposed between each pair of fuel cell subassemblies. The current collectors at the ends of the stack are preferably in the form of terminal subassemblies. Each subassembly includes a manifold plate, an annular plate-type bellows sealed to a through-plate opening in the manifold plate, and a central element sealed to the inner diameter of the bellows. In the case of the fuel cell assembly, the central element is multilayer fuel cell plate having an electrolyte layer sandwiched between an anode layer and a cathode layer. In the case of the interconnect assembly and the terminal assembly, the central element is a metallic plate with protrusions that make contact to the adjacent fuel cell plate. The combination of the bellows and the protrusions accommodate dimensional changes within the fuel cell.

17 Claims, 3 Drawing Sheets

SOLID OXIDE FUEL CELL STACKING ASSEMBLY

BACKGROUND OF THE INVENTION

This invention relates to a solid oxide fuel cell assembly, and, more particularly, to a fuel cell stacking assembly that can accommodate the dimensional changes resulting from differences in thermal expansion and/or contraction of the fuel cell assembly components, during operation or fabrication.

A fuel cell is a device in which a first reactant, a fuel such as hydrogen or a hydrocarbon, is electrochemically reacted with a second reactant, an oxidant such as air or oxygen, to produce a DC electrical output. A fuel cell includes an anode, or fuel electrode, which enhances the rate at which electrochemical reactions occur on the fuel side. There is also a cathode, or oxidant electrode, which functions similarly on the oxidant side. In the solid oxide fuel cell, a solid electrolyte, made of dense yttria-stabllized zirconia (YSZ) ceramic separates a porous ceramic anode from a porous ceramic cathode. The anode typically is made of nickelous oxide/YSZ cermet, and the cathode is typically made of doped lanthanum manganite.

In such a fuel cell the fuel flowing to the anode reacts with oxide ions to produce electrons and water, which is removed in the fuel flow stream. The oxygen reacts with the electrons on the cathode surface to form oxide ions that diffuse through the electrolyte to the anode. The electrons flow from the anode through an external circuit and thence to the cathode. The electrolyte is a nonmetallic ceramic that is a nonconductor of electrons, ensuring that the electrons must pass through the external circuit to do useful work. However, the electrolyte permits the oxide ions to pass through from the cathode to the anode.

Each individual electrochemical cell, made of a single anode, a single electrolyte, and a single cathode, generates a relatively small voltage. To achieve higher voltages that are practically useful, the individual electrochemical cells are connected together in series to form a stack. The cells are connected in series electrically in the stack. The fuel cell stack includes an electrical interconnect between the cathode and the anode of adjacent cells. The fuel cell assembly also includes ducts or manifolding to conduct the fuel and oxidant into and out of the stack.

In one type of fuel cell assembly adapted for use at high operating temperatures, the entire structure is made of ceramics. While such monolithic fuel cells are useful, ceramics have the inherent material characteristic of low ductility and low toughness. Consequently, they are susceptible to damage by mechanical vibrations and shocks. They are also susceptible to thermal shocks and to thermally induced mechanical stresses due to the different thermal expansion characteristics of the components.

Where the fuel cell is to be used at lower temperatures with a low-temperature ceramic electrolyte, some components of the fuel cell may be made of metals. Metal components are generally less expensive to fabricate than ceramic components and have the advantage of improved ductility and fracture toughness. Metal components are therefore more resistant to mechanical and thermal shock damage than ceramics, offering the potential for construction of more robust fuel cells than possible with all-ceramic fuel cells.

In such a low-temperature fuel cell using metals for at least some components and ceramics for at least some components (all known operable solid oxide fuel cell electrolytes are ceramics), there may be large thermal stresses and strains produced during operation of the fuel cell. Metals as a group have much higher coefficients of thermal expansion than do ceramics. When the metal/ceramic fuel cell is heated and cooled, the dimensions of the metal components change more than the dimensions of the ceramic components, leading to thermal strains within the structure. Unless controlled, the thermal strains produce thermal stresses that can lead to failure of the ceramic components or the seals between the ceramic and metal components.

There is a need for a fuel cell design in which a combination of metallic and ceramic components can be used. Such a fuel cell should be resistant to damage from thermal strains and the resulting thermal stresses that arise due to the differences in the thermal expansion coefficients of the components. The present invention fulfills this need, and further provides related advantages.

SUMMARY OF THE INVENTION

The present invention provides a fuel cell stacking assembly that is resistant to damage produced by the accumulation of thermal strains. The fuel cell can be made of different materials having different thermal expansion coefficients. Such a design is particularly useful for building a fuel cell assembly for operation at intermediate temperature, with most of the components being made of metal but the electrolyte being made of a ceramic. The fuel cell can be manufactured less expensively than conventional fuel cells. It is more robust in :service and is resistant to damage from thermal cycling.

In accordance with the invention, a solid oxide fuel cell stacking assembly comprises a stack having at least one fuel cell assembly. Each fuel cell assembly in turn comprises at least two fuel cell plates, each fuel cell plate having an anode side, a cathode side, and an electrolyte therebetween. There is means for contacting a first reactant to the anode side of the fuel cell plate and means for contacting a second reactant to the cathode side of the fuel cell plate. The fuel cell assembly further includes means for establishing an electrical interconnect between one side of each fuel cell plate and an adjacent fuel cell plate, and means for accommodating dimensional changes of the stack. The means for accommodating is operable to compensate for both in-plane and perpendicular dimensional changes relative to the fuel cell plate. The stack includes means for introducing a flow of the first reactant to the anode side of each of the fuel cell plates and for removing a flow of first reactant from the anode side of each of the fuel cell plates, means for introducing a flow of the second reactant to the cathode side of each of the fuel cell plates and for removing a flow of first reactant from the cathode side of each of the fuel cell plates, and means for collecting a current flow from the ends of the stack.

In one embodiment, a solid oxide fuel cell stacking assembly that utilizes a first reactant and a second reactant to produce electrical power, comprises a stack having at least one fuel cell assembly, a pair of terminal plate subassemblies, one at each end of the stack for establishing electrical connection to each end of the s tack, and appropriate fluid-flow plenums for introducing flows of the reactants to each fuel cell assembly and conducting away flows from each fuel cell assembly.

In this approach, each fuel cell assembly comprises at least two fuel cell plate subassemblies and an interconnect subassembly disposed between each pair of fuel cell plate subassemblies. Each of the fuel cell plate subassemblies includes a fuel cell manifold plate having a fuel cell manifold plate through-plate central opening therethrough. An annular fuel cell plate bellows is disposed within the fuel cell manifold plate central opening and sealed to the fuel cell manifold plate. The fuel cell plate bellows has a fuel cell plate bellows central opening therethrough. A fuel cell plate is disposed within the fuel cell plate bellows central opening and sealed to the fuel cell plate bellows. The fuel cell plate preferably is formed as a three layer structure having an electrolyte layer disposed between an anode layer and a cathode layer.

Each interconnect subassembly includes an interconnect manifold plate having a first-reactant transverse flow channel on a first side thereof, a second-reactant transverse flow channel on a second side thereof, and an interconnect manifold through-plate central opening therethrough. An annular interconnect bellows is disposed within the interconnect manifold central opening and sealed to the interconnect manifold. The interconnect bellows has an interconnect bellows central opening therethrough. An electrically conductive interconnect plate is disposed within the interconnect bellows central opening and is sealed to the interconnect bellows. The interconnect plate is impermeable to the first reactant and the second reactant and has compliant metallic interconnect protrusions extending therefrom on each side thereof.

Each terminal plate subassembly comprises a terminal manifold plate having a terminal transverse flow channel on one side thereof and a terminal manifold through-plate central opening therethrough. An annular terminal bellows is disposed within the terminal manifold central opening and is sealed to the terminal manifold. The terminal bellows has a terminal bellows central opening therethrough. An electrically conductive terminal plate is disposed within the terminal bellows central opening and is sealed to the terminal bellows. The terminal plate is impermeable to the reactants and has compliant metallic terminal protrusions extending therefrom on the same side as the terminal transverse flow channel.

With this design, the transverse flow channels are preferably oriented at right angles to each other. The stack is made square or rectangular, so that the plenums for introducing and removing each reactant can be attached to opposite sides of the stack. That is, the first-reactant inlet and outlet plenums are sealed to two opposing sides of the stack, and the second-reactant inlet and outlet plenums are sealed to the other two opposing sides of the stack. This permits straightforward plenum attachment with good access to the fuel cell stacking assembly.

The fuel cell plates, the interconnect plates, and the terminal plates are supported within the fuel cell stacking assembly in a compliant manner that accommodates both in-plane and out-of-plane strains. The bellows are the primary element for accommodating the in-plane strains. The protrusions on the interconnect and terminal plates are the primary element for accommodating the perpendicular strains. By accommodating the strains that are produced within the structure, large thermal stresses do not arise to damage the ceramic components of the structure.

The present invention provides an advance in the art of fuel cells. The fuel cell of the invention can be made of the most desirable combination of metals and ceramics, while avoiding damage resulting from their varying thermal expansion coefficients. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
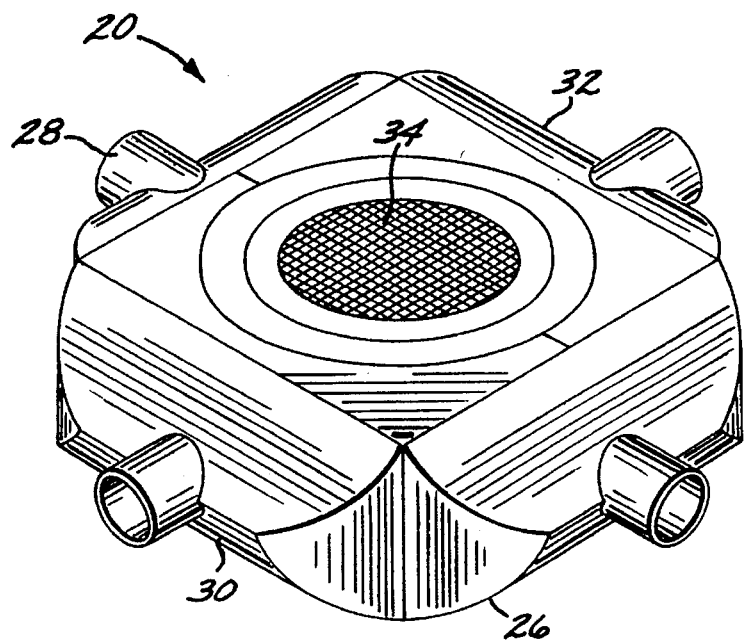
FIG. 1 is a perspective view of a fuel cell assembly.
Figure 2:
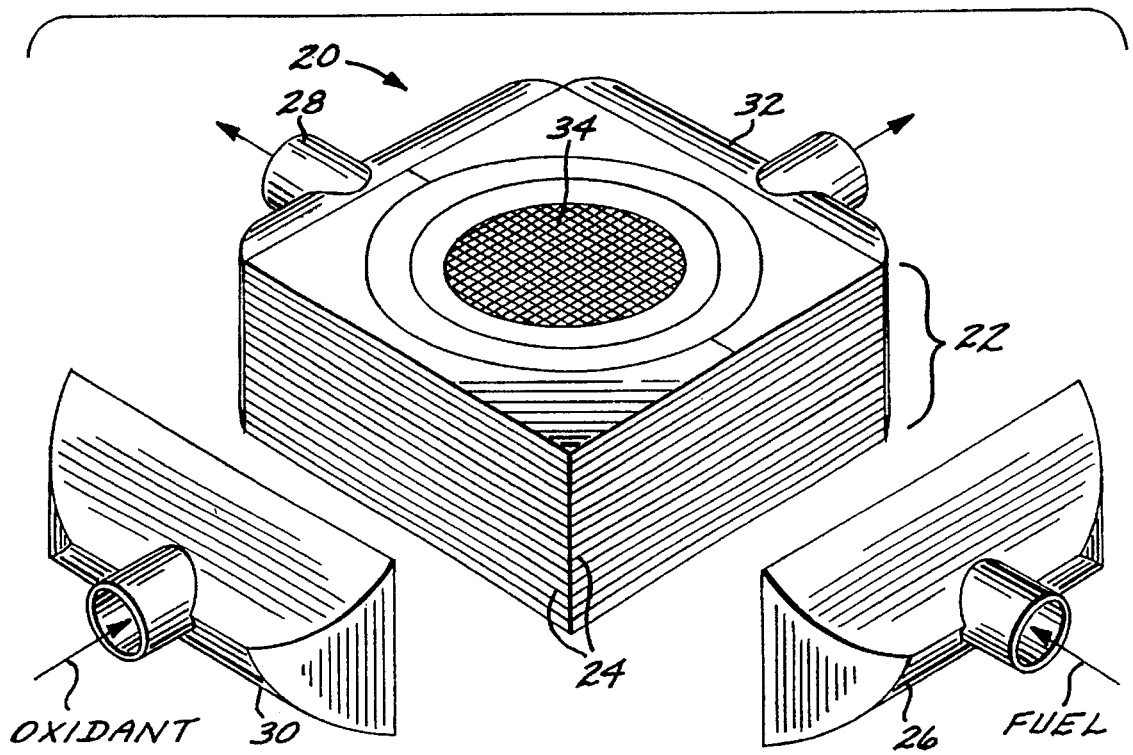
FIG. 2 is a partially exploded view of the fuel cell assembly of FIG. 1.

A fuel cell assembly 20 is depicted in FIGS. 1 and 2. The fuel cell assembly 20 includes a stack 22 of subassemblies 24, which will be illustrated and discussed in more detail subsequently. The fuel cell operates utilizing two reactants, fuel and oxidant. The fuel is supplied to the subassemblies 24 through a fuel inlet plenum 26, and unreacted fuel and reaction products are removed through a fuel outlet plenum 28. The oxidant is supplied to the subassemblies 24 through an oxidant inlet plenum 30, and excess oxidant is removed through an oxidant outlet plenum A metal strip or screen 34 at each end of the fuel cell assembly 20 collects electrical current from the electrodes for conduction to an external circuit.

Figure 3:
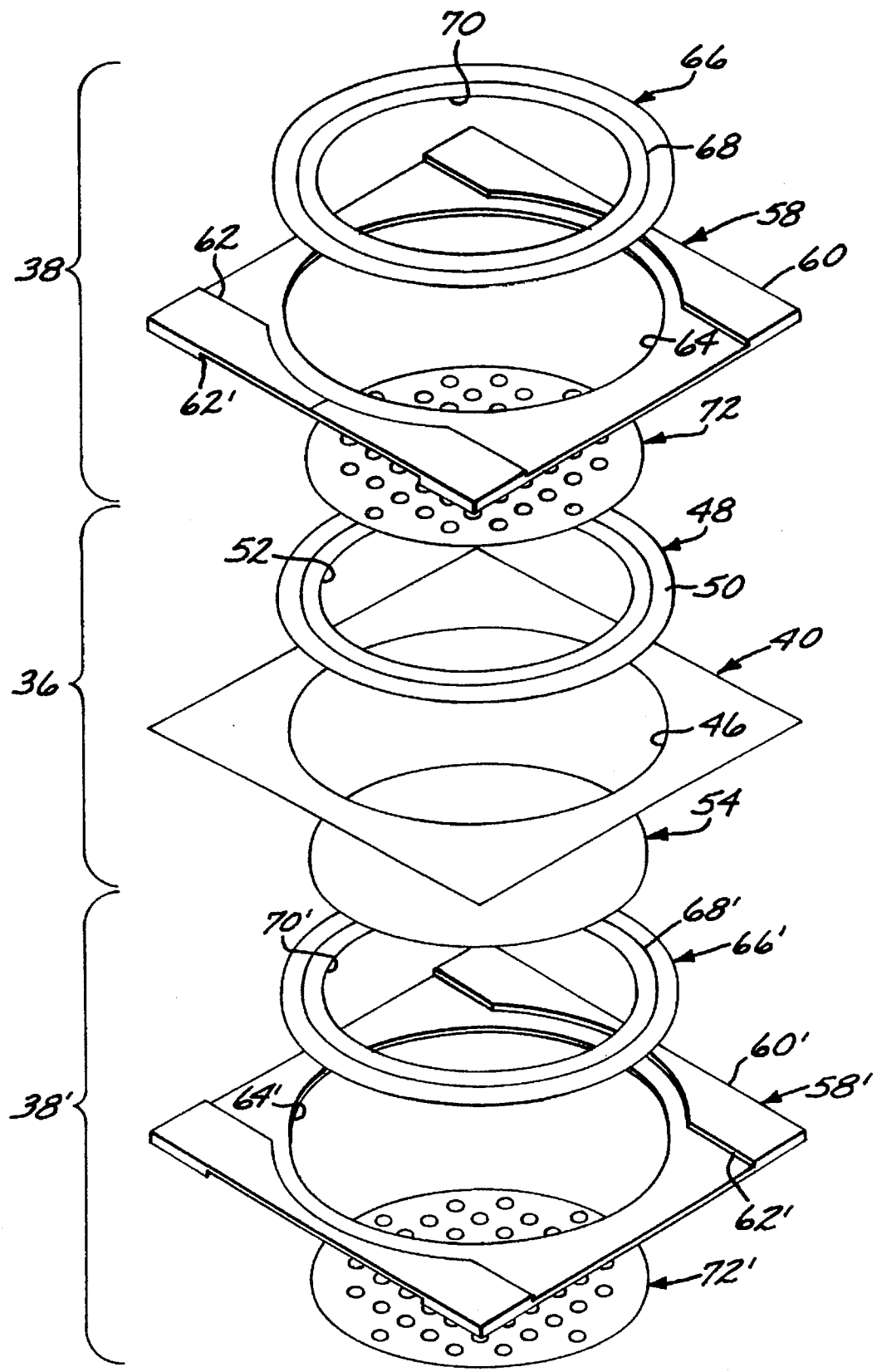
FIG. 3 is an exploded view of a portion of the fuel cell assembly.

FIG. 3 illustrates a portion of the stack 22 in greater detail. The stack 22 may be viewed as being formed of three types of subassemblies. A fuel cell plate subassembly 36 includes a fuel cell plate, an interconnect subassembly 38 includes an interconnect plate, and a terminal subassembly includes a terminal plate. FIG. 3 shows one of each of the subassemblies 36, 38, and 38' for economy of illustration. In practice, within a commercial fuel cell assembly 20 there are typically twenty or more of each type of the subassemblies 36 and 38 arranged in alternating fashion, and one of the subassemblies 38' at each end of the stack 22.

Figure 4:
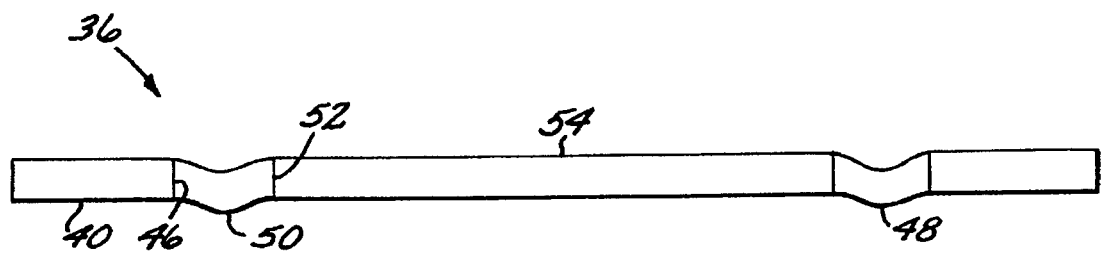
FIG. 4 is an enlarged, side sectional view of a fuel cell plate subassembly.

The fuel cell plate subassembly 36, also depicted in assembled side sectional view in FIG. 4 to show the assembled relation of the components, includes a manifold plate 40. The preferred form of the manifold plate 40 is a generally flat, metallic plate. The manifold plate 40 has a first through-plate central opening 46 therethrough.

An annular subassembly bellows 48 is sized to be disposed within the central opening 45. The outer periphery of the bellows 48 is sealed to the inner periphery of the manifold plate 40 at the opening 46. The bellows 48 is a component that accommodates radial dimensional differences between the manifold plate 40 and a fuel cell plate (described subsequently) that is retained within the bellows 48. The preferred bellows 48 is in the form of a generally flat, metallic annulus that has been deformed to create a circumferentially extending ridge 50 or other out-of-plane feature that permits the annulus to readily deform in the radial direction. Such a form of bellows is suitable for the present application, inasmuch as the radial deformations are not excessively large, and the ridge permits the bellows annulus to accomplish the required accommodation deformation. The bellows 48 has a fuel cell plate subassembly bellows central opening 52 therethrough.

A fuel cell plate 54 is sized to be disposed within the central opening 52. The outer periphery of the fuel cell plate 54 is sealed to the inner periphery of the central opening 52 of the bellows 48. The preferred form of the fuel cell plate 54 is a flat plate made of three layers of ceramic material, an impermeable solid oxide electrolyte sandwiched between a fuel electrode and a porous cathode.

The fuel cell plate subassembly 36 is fabricated by first preparing the components 40, 48, and 54. In a typical case, the manifold plate 40 is a square or rectangular plate made of a high temperature, oxidation resistant metal such as Inco 601, having a thickness of about 0.010 inch or less, a square external dimension of about 9 inches, and a circular opening 46 with a diameter of about 8 inches. The bellows 48 is a circular annulus made of a thin foil of a ductile, oxidation resistant metal such as Inco 601, with an outer diameter about 0.050 inches larger than the diameter of the opening 46, a width between the outer annular diameter and the inner annular diameter of about 0.25 inches, and a thickness of about the same as that of the manifold plate. The fuel cell plate 54 is a circular flat plate with an external diameter about 0.050 larger than that of the opening 52. The three-layer fuel cell plate 54 is made by any process by which the anode, the solid electrolyte, and the cathode can be formed into a single trilayer structure. In the presently preferred approach, a tape-calendared bilayer structure of the anode and the solid electrolyte is prepared and sintered. The solid electrolyte is preferably made of dense YSZ (yttria-stabilized zirconia) and the anode is preferably made of porous nickelous oxide/YSZ. The cathode is applied to this bilayer by screen printing or other technique to form a trilayer structure. The cathode is preferably porous doped lanthanum manganite. The trilayer is fired. The components 40, 48, and 54 are assembled together by brazing the bellows 48 to the manifold plate 40, and sealing the fuel cell plate 54 to the bellows 48 with a non-conducting sealant such as glass, to form the first subassembly 36 shown in FIG. 4.

Figure 5:
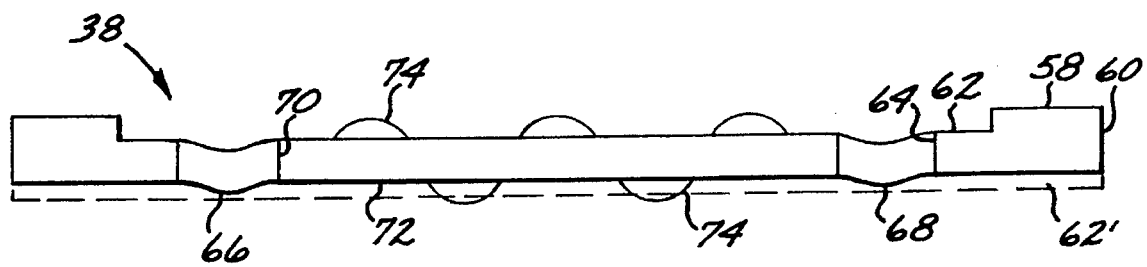
FIG. 5 is an enlarged, side sectional view of an interconnect subassembly.

The interconnect subassembly 38, shown in FIG. 3 and also depicted in assembled side sectional view in FIG. 5 to show the assembled relation of the components, includes an interconnect manifold plate 58. The preferred form of the interconnect manifold plate 58 is a generally flat, metallic plate 60 with transverse flow channels 62 and 62' cut into the opposite sides of the metallic plate 60 and running perpendicular to each other. Each of the flow channels 62 and 62' is a recess in the manifold plate 60 that constrains a gas to flow from one lateral side of the plate 60 to the other. One of the flow channels is aligned to conduct fuel from the fuel inlet plenum 26 to the fuel outlet plenum 28, and the other of the flow channels is aligned to conduct oxidant from the oxidant inlet plenum 30 to the oxidant outlet plenum 32. The interconnect manifold plate 38 has a manifold through-plate central opening 64 therethrough.

An annular interconnect subassembly bellows 66 is sized to be disposed within the central opening 64. The outer periphery of the bellows 66 is sealed to the inner periphery of the interconnect manifold plate 58 at the opening 64. The bellows 66 is a component that accommodates radial dimensional differences between the interconnect manifold plate 58 and an interconnect (described subsequently) that is retained within the bellows 66. The preferred bellows 66 is in the form of a generally flat, metallic annulus that has been deformed to create a circumferential ridge 68 or other out-of-plane feature that permits the annulus to readily deform in the radial direction. Such a form of bellows is suitable for the present application, inasmuch as the radial deformations are not excessively large, and the ridge permits the bellows annulus to accomplish the required accommodation deformation. The bellows 66 has an interconnect bellows central opening 70 therethrough.

An interconnect plate 72 is sized to be disposed within the central opening 70. The outer periphery of the interconnect plate 72 is sealed to the inner periphery of the bellows 85 along the central opening 70.

The interconnect plate 72 is a generally flat plate having compliant metallic interconnect protrusions 74 on both sides thereof. The protrusions serve three important functions. First, they accomplish an electrical interconnection between the fuel cell plates 54 of the adjacent electrochemical fuel cell assemblies 24. Second, when assembled with alternating fuel cell plate subassemblies 36 and the terminal subassemblies to form the stack 22, they contact the neighboring fuel cell plates 54 to provide a spacing through which the first reactant (on one side of the fuel cell plate) and the second reactant (on the other side of the fuel cell plate) can flow. Third, they are sufficiently compliant to accommodate dimensional changes of the stack 22 perpendicular to the plane of the plates (i.e., along the axis of the stack). The protrusions 74 may be of any operable form, within the constraint that the interconnect plate 72 be impervious to the first reactant and the second reactant, so that the reactants are not permitted to intermix.

Figure 6:
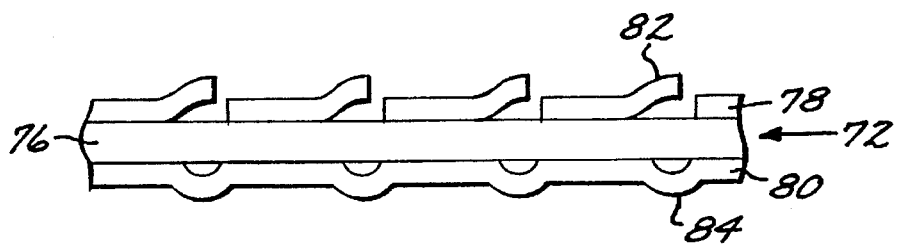
FIG. 6 is an enlarged, side elevational view of an interconnect structure.

FIG. 6 illustrates a preferred construction for the interconnect plate 72. This plate 72 has a solid metallic layer 76, sandwiched and brazed between two metallic protruding layers 78 and 80. The layers 78 and 80 are illustrated with two different types of protrusions, to indicate some of the possible alternative compliant constructions. The first protruding layer 78 has cutout fingers 82 extending outwardly to form the protrusions. The second protruding layer 80 has punched dimples 84 extending outwardly to form the protrusions. The solid layer 76 is required to provide impermeability in the case of a layer having fingers 82 that result from making openings through the layer. The solid layer 76 is optional in the case where dimples are formed, and in that case it may be possible to braze two dimpled plates together in a back-to-back fashion to form the interconnect plate 72. However, it also may be desirable to utilize a solid layer 76 even where the protrusions do not intentionally cause a break in their layers, to safeguard against the possibility of accidental penetrations that would permit fuel and oxidant to mix together.

The interconnect assembly 38 is fabricated by first preparing the components 58, 66, and 72 in the manner described. In a typical case, the manifold plate 58 is a square or rectangular plate made of a high temperature, oxidation resistant metal such as Inco 601, having a thickness of about 0.010 inch, and an external dimension and circular opening 64 dimensioned to align with the corresponding elements of the fuel cell plate subassembly 96. The bellows 66 is a circular annulus made of a thin foil of a ductile, oxidation resistant metal such as Inco 601, with an outer diameter about 0.050 inch larger than the diameter of the opening 64, an opening 70 having a with between the outer and inner annular diameters of about 0.25 inches, and a thickness the same as that of the manifold plate. The interconnect plate 72 is a circular, generally flat plate (with the protrusions thereon) made in the manner described, with an external diameter about 0.050 inches larger than that of the opening 70. The components 58, 66 and 72 are assembled together by brazing the bellows 66 to the manifold plate 58, and then sealing the interconnect plate 72 to the bellows 65 using a non-conducting sealant such as glass, to form the interconnect subassembly 38 shown in FIG. 5.

Figure 7:
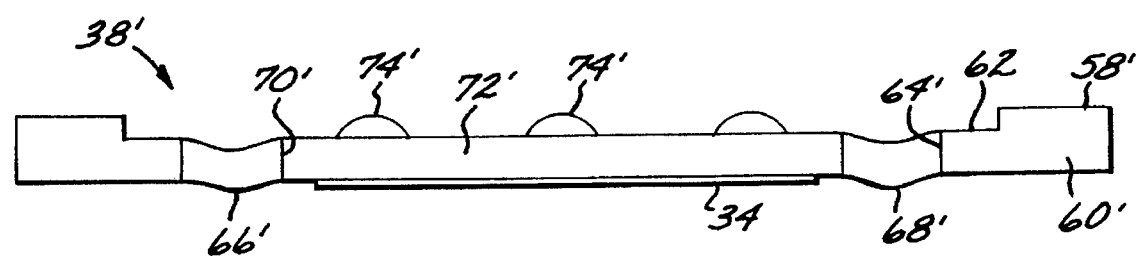
FIG. 7 is an enlarged, side elevational view of a terminal subassembly.

The terminal subassembly 38', shown in FIG. 3 and also depicted in assembled side sectional view in FIG. 7 to show the assembled relation of the components, is similar in form to the interconnect subassembly 38. The terminal subassembly 38' is positioned at an end of the stack 22, and therefore is provided with certain relevant structure found on the interconnect 38 on the side facing inwardly to the stack. The terminal subassembly 38' includes a terminal manifold plate 58'. The preferred form of the interconnect manifold plate 58' is a generally flat, metallic plate with a transverse flow channel 62 cut therein. The flow channel 62 is a recess in the manifold plate 58' that constrains a gas to flow from one lateral side of the plate 58' to the other. The terminal manifold plate 38' has a terminal manifold through-plate central opening 64' therethrough.

An annular terminal subassembly bellows 66' is sized to be disposed within the central opening 64'. The outer periphery of the bellows 66' is sealed to the inner periphery of the terminal manifold plate 58' at the opening 64'. The bellows 66' is a component that accommodates radial dimensional differences between the terminal manifold plate 58' and a terminal plate (described subsequently) that is retained within the bellows 66'. The preferred bellows 66' is in the form of a generally flat, metallic annulus that has been deformed to create a circumferential ridge 68' or other out-of-plane feature that permits the annulus to readily deform in the radial direction. Such a form of bellows is suitable for the present application, inasmuch as the radial deformations are not excessively large, and the ridge permits the bellows annulus to accomplish the required accommodation deformation. The bellows 66' has a terminal subassembly bellows central opening 70' therethrough.

A terminal plate 72' is sized to be disposed within the central opening 70'. The outer periphery of the terminal plate 72' is sealed to the inner periphery of the bellows 66' along the central opening 70'.

The terminal plate 72' is a generally flat plate having compliant metallic interconnect protrusions 74' on one side thereof. The protrusions 74' are comparable with the protrusions 74 in form and function, except that they are provided only on the side of the terminal plate 72' that faces inwardly toward the stack 22. The screen 34 for current collection is attached to the other, outwardly facing, side of the terminal plate 72.

The terminal assembly 38' is fabricated by first preparing the components 58', 66', and 72' in the manner described. In a typical case, these components are of the same dimensions as the respective components 58, and 72, except as noted above, and are assembled in the same manner as previously described for the interconnect assembly 38.

The preferred design utilizing the fuel cell assembly 20 of the invention is optimized for operating at intermediate temperatures up to about 700°–800° C. In this fuel cell assembly 20, the manifold plates 40, 58, and 58', the bellows 48, 66, and 66', and the interconnect plates 72 and 72' are made of metals that are operable for extended periods in this temperature range. Operable metals include the alloys Inco 601, having a composition, in weight percent, of 60 percent nickel, 23 percent chromium, 1 percent aluminum, 1 percent manganese, balance iron; Inco 617, having a composition, in weight percent, of 52 percent nickel, 22 percent chromium, 12.5 percent cobalt, 9 percent molybdenum, 1 percent aluminum, balance minor constituents; Inco 625, having a composition, in weight percent, of 58 percent nickel, 22 percent chromium, 5 percent iron, 9 percent molybdenum, and 3 percent cobalt, balance minor constituents; Inco 690, having a composition, in weight percent, of 58 percent nickel, 29 percent chromium, and 9 percent iron, balance minor constituents; Hastelloy X, having a composition, in weight percent, of 21 percent chromium, 9 percent molybdenum, 1 percent tungsten, 18 percent iron, balance nickel; Haynes 25, having a composition, in weight percent, of 10 percent tungsten, 20 percent chromium, 15 percent tungsten, 3 percent iron, 1 percent molybdenum, 1 percent silicon, balance cobalt; and Haynes 188, having a composition, in weight percent, of 22 percent nickel, 22 percent chromium, 14 percent tungsten, 3 percent iron, 1 percent manganese, balance cobalt. The screen 34 is also preferably made of one of these materials. All of these materials are available commercially.

The interconnect plate 72 is preferably coated with a noble metal such as gold, palladium, rhodium, platinum, or an electron-conductive ceramic on the protrusions 74 that act as electrical contacts. The noble metal coating or ceramic resists oxidation and provides a contact of low electrical resistance to the neighboring structure.

The preferred fuel cell plate 54 is made of a yttria-stabiliized zirconia (YSZ) electrolyte, nickelous oxide/YSZ cermet anode, and doped lanthanum chromite cathode.

After they are prepared, the subassemblies 36, 38, and 38' are stacked together in the manner shown in FIGS. 2–3. The subassemblies 96 and 98 are stacked in an alternating fashion with one of the subassemblies 38' at each of the ends.

After stacking, the subassemblies are sealed along their external edges (except where the plenums are to be attached). In the preferred design, where the manifold plates 40, 58, and 58' are metallic, the edge seals can be brazed. After the edges of the stack are sealed, the plenums 26, 28, 30, and 32 are joined to the stack. Again, in the preferred design, where the manifold plates and the plenums are metallic, the joining is accomplished by brazing. External fuel and oxidant lines are attached to the plenums, and the fuel cell is ready for operation. Fuel and oxidant are supplied to the fuel cell at ambient or higher pressure.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A solid oxide fuel cell stacking assembly that utilizes a first reactant and a second reactant to produce electrical power, comprising:

a stack having at least one fuel cell assembly, each fuel cell assembly comprising
at least two fuel cell plate subassemblies, each of which fuel cell plate subassemblies includes
a fuel cell manifold plate having a fuel cell manifold plate through-plate central opening therethrough,
an annular fuel cell plate bellows disposed within the fuel cell manifold plate central opening and sealed to the fuel cell manifold plate, the fuel cell plate bellows having a fuel cell plate bellows central opening therethrough, and
a fuel cell plate disposed within the fuel cell plate bellows central opening and sealed to the fuel cell plate bellows;

at least one interconnect subassembly, there being an interconnect subassembly disposed between each pair of fuel cell plate subassemblies, each interconnect subassembly including an interconnect manifold plate having a first-reactant transverse flow channel on a first side thereof, a second-reactant transverse flow channel on a second side thereof, and an interconnect manifold through-plate central opening therethrough, an annular interconnect bellows disposed within the interconnect manifold central opening and sealed to the interconnect manifold, the interconnect bellows having an interconnect bellows central opening therethrough, and an electrically conductive interconnect plate disposed within the interconnect bellows central opening and sealed to the interconnect bellows, the interconnect plate being impermeable to the first reactant and the second reactant and having compliant metallic interconnect protrusions extending therefrom on each side thereof;

means for establishing electrical connection to each end of the stack;

means for introducing a first reactant into a first end of each of the first-reactant transverse flow channels and removing first reactant from a second end of each of the first-reactant transverse flow channels; and means for introducing a second reactant into a first end of each of the second-reactant transverse flow channels and removing second reactant from a second end of each of the second-reactant transverse flow channels.

2. The fuel cell stacking assembly of claim 1, wherein the first-reactant transverse flow channel and the second-reactant transverse flow channel are oriented at a right angle to each other.

3. The fuel cell stacking assembly of claim 1, wherein each of the interconnect plates is made of metal.

4. The fuel cell stacking assembly of claim 1, wherein each fuel cell plate bellows and each interconnect bellows is made of metal.

5. The fuel cell stacking assembly of claim 1, wherein the fuel cell plate comprises a three-layer structure including an electrolyte layer disposed between an anode layer and a cathode layer.

6. The fuel cell stacking assembly of claim 1, wherein the interconnect plate comprises a solid metallic layer, a first protruding layer disposed on a first side of the solid metallic layer and having a plurality of protrusions facing away from the solid metallic layer, and a second protruding layer disposed on a second side of the solid metallic layer and having a plurality of protrusions facing away from the solid metallic layer.

7. The fuel cell stacking assembly of claim 1, wherein the means for establishing electrical connection to each end of the stack comprises a pair of terminal plate subassemblies, one at each end of the stack, each terminal plate subassembly comprising:

a terminal manifold plate having a terminal transverse flow channel on one side thereof and a terminal manifold through-plate central opening therethrough;

an annular terminal bellows disposed within the terminal manifold central opening and sealed to the terminal manifold, the terminal bellows having a terminal bellows central opening therethrough; and an electrically conductive terminal plate disposed within the terminal bellows central opening and sealed to the terminal bellows, the terminal plate being impermeable to the reactants and having compliant metallic terminal protrusions extending therefrom on the same side as the terminal transverse flow channel.

8. A solid oxide fuel cell stacking assembly, comprising:

a stack having at least one fuel cell assembly, each fuel cell assembly comprising at least two fuel cell plates, each fuel cell plate having an anode side, a cathode side, and an electrolyte therebetween, means for contacting a first reactant to the anode side of the fuel cell plate, means for contacting a second reactant to the cathode side of the fuel cell plate, means for establishing an electrical interconnect between one side of each fuel cell plate and an adjacent fuel cell plate, and at least two annular fuel cell bellows for accommodating dimensional changes of the stack, the annular fuel cell bellows being operable to compensate for both in plane and perpendicular dimensional changes relative to the fuel cell plate;

means for introducing a flow of the first reactant to the anode side of each of the fuel cell plates and for removing a flow of first reactant from the anode side of each of the fuel cell plates;

means for introducing a flow of the second reactant to the cathode side of each of the fuel cell plates and for removing a flow of first reactant from the cathode side of each of the fuel cell plates; and means for collecting a current flow from the ends of the stack.

9. The fuel cell stacking assembly of claim 8, wherein each fuel cell plate comprises a three-layer structure including an electrolyte layer disposed between an anode layer and a cathode layer.

10. The fuel cell stacking assembly of claim 8, wherein each fuel cell assembly further comprises at least two fuel cell plate subassemblies, each of which fuel cell plate subassemblies includes a fuel cell manifold plate having a fuel cell manifold plate through-plate central opening therethrough, said annular fuel cell bellows comprising an annular fuel cell plate bellows disposed within the fuel cell manifold plate central opening and sealed to the fuel cell manifold plate, the fuel cell plate bellows having a fuel cell plate bellows central opening therethrough, the fuel cell plate bellows acting, in part, as the means for accommodating dimensional changes of the stack, and the fuel cell plate disposed within the fuel cell plate bellows central opening and sealed to the fuel cell plate bellows.

11. The fuel cell stacking assembly of claim 10, wherein each fuel cell plate bellows is made of metal.

12. The fuel cell stacking assembly of claim 8, wherein each fuel cell assembly further comprises at least one interconnect subassembly, there being an interconnect subassembly disposed between each pair of fuel cell plates, each interconnect subassembly including an interconnect manifold plate having a first-reactant transverse flow channel on a first side thereof, a second-reactant transverse flow channel on a second side thereof, and an interconnect manifold through-plate central opening therethrough, the transverse flow channels comprising, in part, the means for contacting a first reactant to the anode side of the fuel cell plate, and the means for contacting a second reactant to the cathode side of the fuel cell plate, said annular fuel cell bellows comprises an annular interconnect bellows disposed within the interconnect manifold plate central opening and sealed to the interconnect manifold plate, the interconnect bellows having an interconnect bellows central opening therethrough the interconnect bellows acting, in part, as the means for accommodating dimensional changes of the stack, and an electrically conductive interconnect plate disposed within the interconnect bellows central opening and sealed to the interconnect bellows, the interconnect plate being impermeable to the first reactant and the second reactant and having compliant metallic interconnect protrusions extending therefrom on each side thereof, the interconnect plate acting, in part, as the means for establishing an electrical interconnect and the interconnect protrusions acting, in addition to the bellows to accommodate dimensional changes of the stack.

13. The fuel cell stacking assembly of claim 12, wherein the first-reactant transverse flow channel and the second-reactant transverse flow channel are oriented at a right angle to each other.

14. The fuel cell stacking assembly of claim 12, wherein each of the interconnect plates is made of metal.

15. The fuel cell stacking assembly of claim 12, wherein each interconnect bellows is made of metal.

16. The fuel cell stacking assembly of claim 12, wherein the interconnect plate comprises solid metallic layer, first protruding layer disposed on a first side of the solid metallic layer and having a plurality of protrusions facing away from the solid metallic layer, and second protruding layer disposed on a second side of the solid metallic layer and having a plurality of protrusions facing away from the solid metallic layer.

17. The fuel cell stacking assembly of claim 8, wherein the means for collecting a current flow from the ends of the stack comprises a pair of terminal plate subassemblies, one at each end of the stack, each terminal plate subassembly comprising:

a terminal manifold plate having a terminal transverse flow channel on one side thereof and a terminal manifold plate through-plate central opening therethrough, said annular fuel bellows comprises an annular terminal bellows disposed within the terminal manifold plate central opening and sealed to the terminal manifold plate, the terminal bellows having a terminal bellows central opening therethrough, and an electrically conductive terminal plate disposed within the terminal bellows central opening and sealed to the terminal bellows, the terminal plate being impermeable to the reactants and having compliant metallic terminal protrusions extending therefrom on the same side as the terminal transverse flow channel.

* * * * *